United States Patent [19]
Nagai et al.

[11] Patent Number: 6,051,333
[45] Date of Patent: *Apr. 18, 2000

[54] CELL COMPRISING SPIRALLY WOUND ELECTRODES

[75] Inventors: Ryo Nagai, Hirakata; Hiroshi Fukunaga, Settsu; Shoichiro Tateishi, Ibaraki, all of Japan

[73] Assignee: Hitachi Maxell, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/746,341

[22] Filed: Nov. 8, 1996

[30] Foreign Application Priority Data

Nov. 8, 1995 [JP] Japan .................................. 7-315943

[51] Int. Cl.$^7$ .................................................. H01M 10/24
[52] U.S. Cl. .............................. 429/94; 429/206; 429/245
[58] Field of Search ............................... 429/94, 206, 245

[56] References Cited

U.S. PATENT DOCUMENTS 5,008,165  4/1991  Schmode .................................... 429/94

FOREIGN PATENT DOCUMENTS

62-272472  11/1987  Japan .

*Primary Examiner*—John S. Maples

[57] ABSTRACT

A cell comprising an electrode body having positive and negative electrodes which are spirally wound with interposing a separator therebetween and a cell case in which the electrode body is inserted, wherein a pair of the negative electrodes face respective surfaces of the positive electrode through the separator, and the negative electrodes are in contact with each other substantially in the second and subsequent turns, or wherein the negative electrode comprises a metal substrate and a pair of layers of electrode active material formed on both surfaces of the substrate, provided that the negative electrode which is present in at least one of the innermost and outermost turns of electrode body carries the layer of the electrode active material only on one side of the substrate, and each layer of the electrode active material of the negative electrode faces the positive electrode through the separator.

10 Claims, 12 Drawing Sheets

CELL COMPRISING SPIRALLY WOUND ELECTRODES

BACKGROUND OF THE INVENTION

1. Field of the Invention

The present invention relates to a cell comprising a spirally wound electrode body, for example, an alkaline secondary cell such as a nickel-hydrogen occlusion alloy cell and a nickel-cadmium cell. In particular, the present invention relates to an improvement of the spiral structure of the electrode body to increase the capacity, reliability and productivity of the cells, and to lower the production costs.

2. Prior Art

Figure 11:
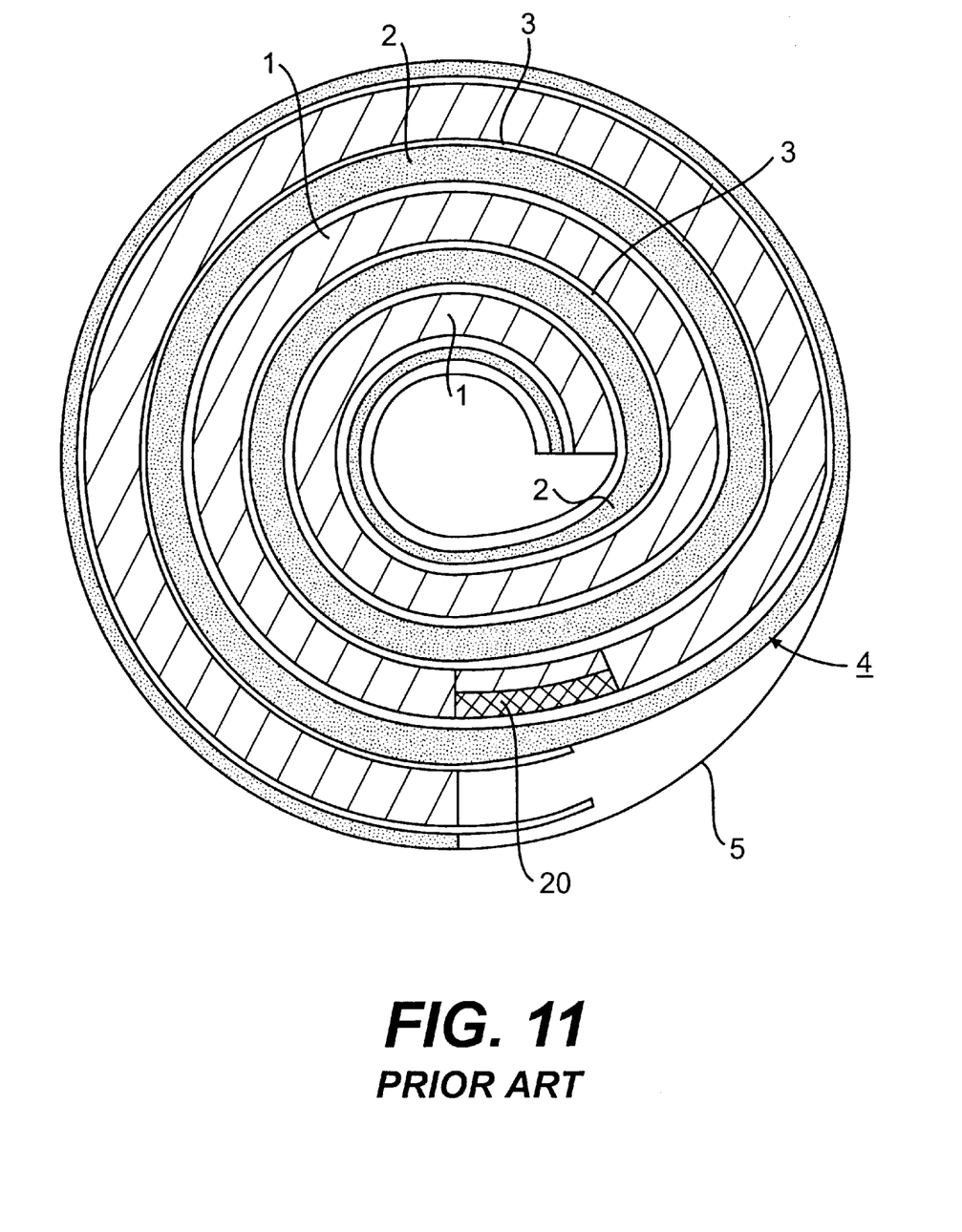
FIG. 11 is a cross section of a conventional electrode body assembled in Comparative Example.

The spiral structure of electrodes which is employed in the nickel-hydrogen occlusion alloy cells or nickel-cadmium cells is shown in FIG. 11, in which one positive electrode 1 and one negative electrode 2 are spirally wound with interposing a separator 3 between them. That is, the positive and negative electrodes 1 and 2 are formed in certain thicknesses and wound to assemble an electrode body 4 having the spiral structure as shown in FIG. 11.

It is necessary for the alkaline secondary cells such as nickel-hydrogen occlusion alloy cells or nickel-cadmium cells to maintain a ratio of the electric capacity of negative electrode to that of positive electrode of at least 1.0, preferably at least 1.2. This ratio is not an overall ratio in the cell but should be maintained at facing areas between the spirally wound positive and negative electrodes. Therefore, the cells comprising the conventional spirally wound electrode body are designed based on the ratio of the electric capacity of negative electrode to that of positive electrode in the part where the both surfaces of the negative electrode face the positive electrodes, that is, in the second turn of the negative electrode. For this reason, the innermost and outermost turns of the negative electrode have the electric capacities larger than the necessary values.

The innermost and outermost turns of the negative electrode of the conventional spirally wound electrode body carry the layers of electrode active materials on both sides of the substrate although only one side faces the positive electrode in those turns. Thus, the electrode active material on the other side is not used effectively, and as the result, the inner volume of the cell is not used fully.

Small cells have a structure such that the outermost turn of the spirally wound electrode body is the negative electrode which is in contact with the inner wall of a cell case to form an electrical connection. Thus, the raised parts of the layer of the electrode active material tend to flaw the inner wall of the cell case, and the flaws may lead to serious defects of the alkaline cells such as leakage of an electrolytic solution.

The conventional negative electrode comprises a nickel sintered substrate which is produced by coating a nickel powder paste on a perforated iron plate plated with nickel and sintering it, or a porous substrate such as a foam or fibrous metal plate which is produced by plating nickel on a urethane foam or non-woven fabric and sintering it to proceed the electrode reactions on the both surfaces. Therefore, the costs for equipments for producing the electrode bodies or the substrates increase, and an enormous amount of work is necessary for the stable production of the electrode bodies or the substrates having constant properties.

SUMMARY OF THE INVENTION

The present invention intends to solve the above problems.

An object of the present invention is to provide a cell comprising a spirally wound electrode body which can increase the electric capacity by the effective use of the inner volume of the cell, and to increase the productivity of the negative electrodes and reduce the production costs of the cells.

Another object of the present invention is to provide a cell comprising a spirally wound electrode body which does not flaw the inner wall of the cell case.

According to a first aspect of the present invention, there is provided a cell comprising an electrode body having positive and negative electrodes which are spirally wound with interposing a separator therebetween and a cell case in which the electrode body is inserted, wherein a pair of the negative electrodes face respective surfaces of the positive electrode through the separator, and the negative electrodes are in contact with each other substantially in the second and subsequent turns.

Preferably, each negative electrode comprises a metal substrate and an electrode active material which is applied on one surface of the substrate or which is contained in pores in the substrate and applied on the surface of the substrate, and the layer of the electrode active material faces the positive electrode through the separator.

According to a second aspect of the present invention, there is provided a cell comprising an electrode body having positive and negative electrodes which are spirally wound with interposing a separator therebetween and a cell case in which the electrode body is inserted, wherein the negative electrode comprises a metal substrate and a pair of layers of electrode active material formed on both surfaces of the substrate, provided that the negative electrode which is present in at least one of the innermost and outermost turns of electrode body carries the electrode active material only on one side of the substrate or only in the pores of the substrate and on one side of the substrate, and each layer of the electrode active material of the negative electrode faces the positive electrode through the separator.

DETAILED DESCRIPTION OF THE INVENTION

The innermost and outermost turns used herein are not limited to the exactly innermost and outermost turns. For example, they may include some parts of the adjacent turns to the innermost and outermost turns, or slightly shorter than the exact lengths of the innermost and outermost turns.

The amount of the electrode active material per unit area of the inner layer (with respect to the positive electrode) of the negative electrode active material is equal to and preferably larger than that of the outer layer of the negative electrode active material in the same turn to keep the ratio of the electric capacity of the negative electrode to that of the positive electrode constant at any part. The weight ratio of the negative electrode active material per unit area of the inner layer of the electrode active material to that of the outer layer of the negative electrode active material is preferably between 1:1 and 1.6:1, more preferably between 1.2:1 and 1.6:1.

This ratio can be adjusted by controlling the thicknesses of the inner and outer layers, when the compositions of the electrode material are the same in the inner and outer layers.

The layer of the electrode active material may consist of the electrode active material alone. Alternatively, it may contain a binder or other components in addition to the electrode active material in many cases.

The surface of the metal substrate of the negative electrode is exposed in the outermost turn of the electrode body when the negative electrode and the electrode body have the above structures. The metal substrate is in contact with the inner wall of the cell case, and therefore the inner wall is not flawed by hard powder such as the hydrogen occlusion alloy. Even the hard substrates produced by metal plating such as the foam metal substrate do not flaw the inner wall of the cell case.

More importantly, the capacity of the cell can be increased by about 30% by the removal of the excessive amounts of the electrode active materials which do not contribute to the electrode reaction from the substrate in the outermost and innermost turns of the negative electrode and furthermore by the use of a very thin metal plate having a thickness of between 10 and 50 $\mu$m or a perforated metal plate having a thickness of between 40 and 70 $\mu$m as the negative electrode substrate which functions as an electrode collector.

The electrode active materials for the negative and positive electrodes may be the conventionally used materials.

The thicknesses of the negative and positive electrodes may be in the conventional ranges.

Other elements or components of the cells may be the same as those used in the conventional cells.

Furthermore, the electrode body and the cell of the present invention can be assembled by the conventional methods except the above structures of the negative electrode and the electrode body.

EXAMPLES

The present invention will be explained further in detail by the following examples, which do not limit the scope of the present invention in any way. In the Examples, % for concentrations is by weight.

Example 1

Twenty-eight wt. parts of a binder solution containing 12% of polyvinylidene fluoride dissolved in N-methylpyrrolidone was mixed in 100 wt. parts of the hydrogen occlusion alloy powder comprising $MmNi_5$ (in which Mm is the misch metal) and thoroughly stirred to obtain a homogeneous paste.

The paste was applied on a nickel plate having a thickness of 20 $\mu$m as a metal substrate at a total thickness of 500 $\mu$m by the squeegee method, and dried on a hot plate, followed by roll pressing to obtain a negative electrode sheet having a total thickness of 200 $\mu$m.

The negative electrode sheet was cut to the size of 35 mm×38 mm, which will be referred to as Negative Electrode Sheet A.

Separately, a negative electrode sheet having the total thickness of 145 $\mu$m was prepared in the same manner as above except that the thickness of applied paste was changed, and cut to the size of 35 mm×55.5 mm, which will be referred to as Negative Electrode Sheet B.

A nickel electrode having the thickness of 660 $\mu$m and the size of 35 mm×46 mm was used as a positive electrode, which was prepared by filling a paste containing nickel hydroxide as an electrode active material in a foam nickel plate according to the conventional method to obtain a positive electrode sheet and cutting the sheet in the above size. A nickel ribbon as a positive electrode collector (tab) was spot welded at one end of the positive electrode.

A separator was a polypropylene non-woven fabric having the thickness of 0.15 mm and the size of 102 mm×38 mm, which had been treated to make it hydrophilic.

Figure 1:
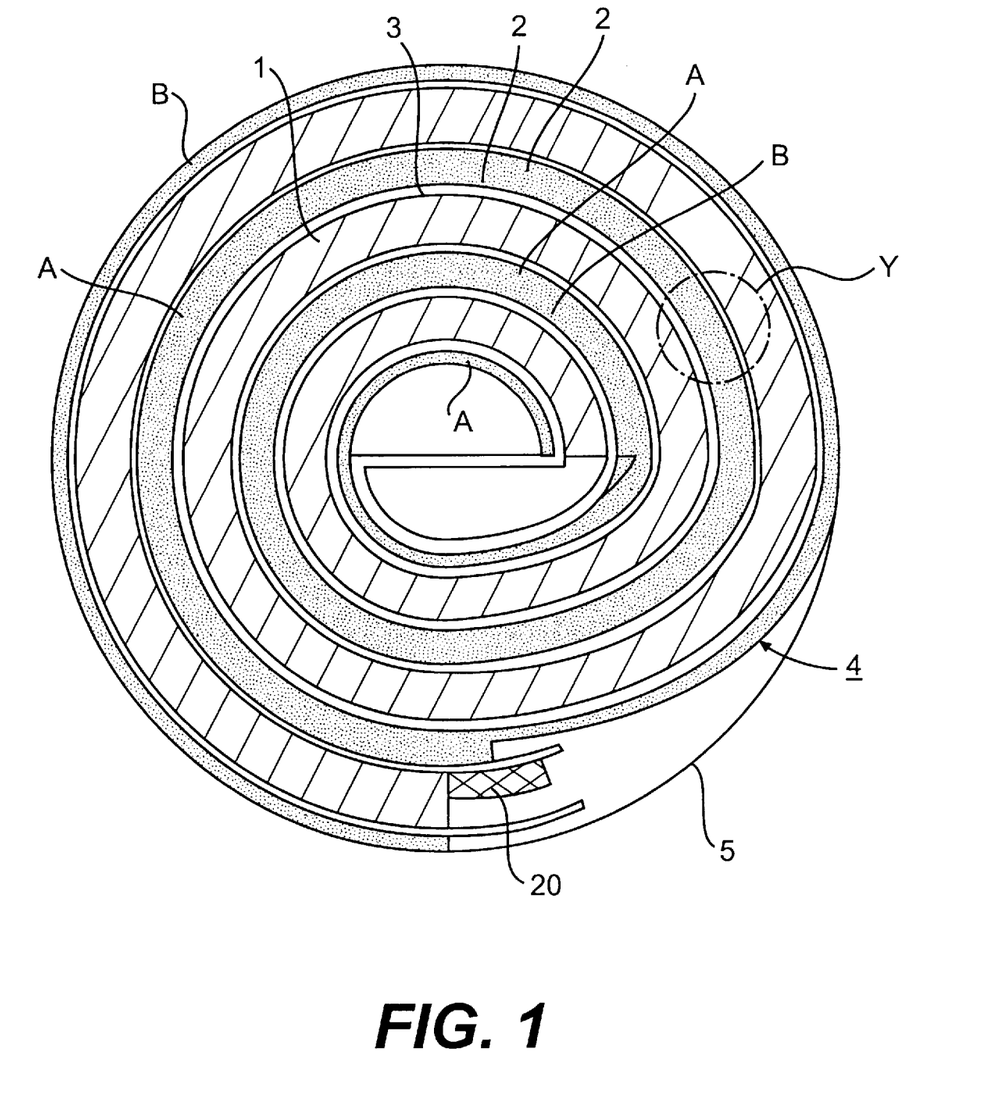
FIG. 1 is a cross section of a spirally wound electrode body according to the first embodiment of the present invention and used in Example 1.

The Negative Electrode Sheets A and B were laminated on respective surfaces of the positive electrode with interposing the separator between them, and spirally wound to assemble an electrode body as shown in FIG. 1.

The electrode body of FIG. 1 is explained in detail.

The negative electrodes 2 are laminated on the respective surfaces of the positive electrode 1 through the separator 3. The negative electrodes are in contact with each other in the second and subsequent turns except the outermost turns.

Figure 2:
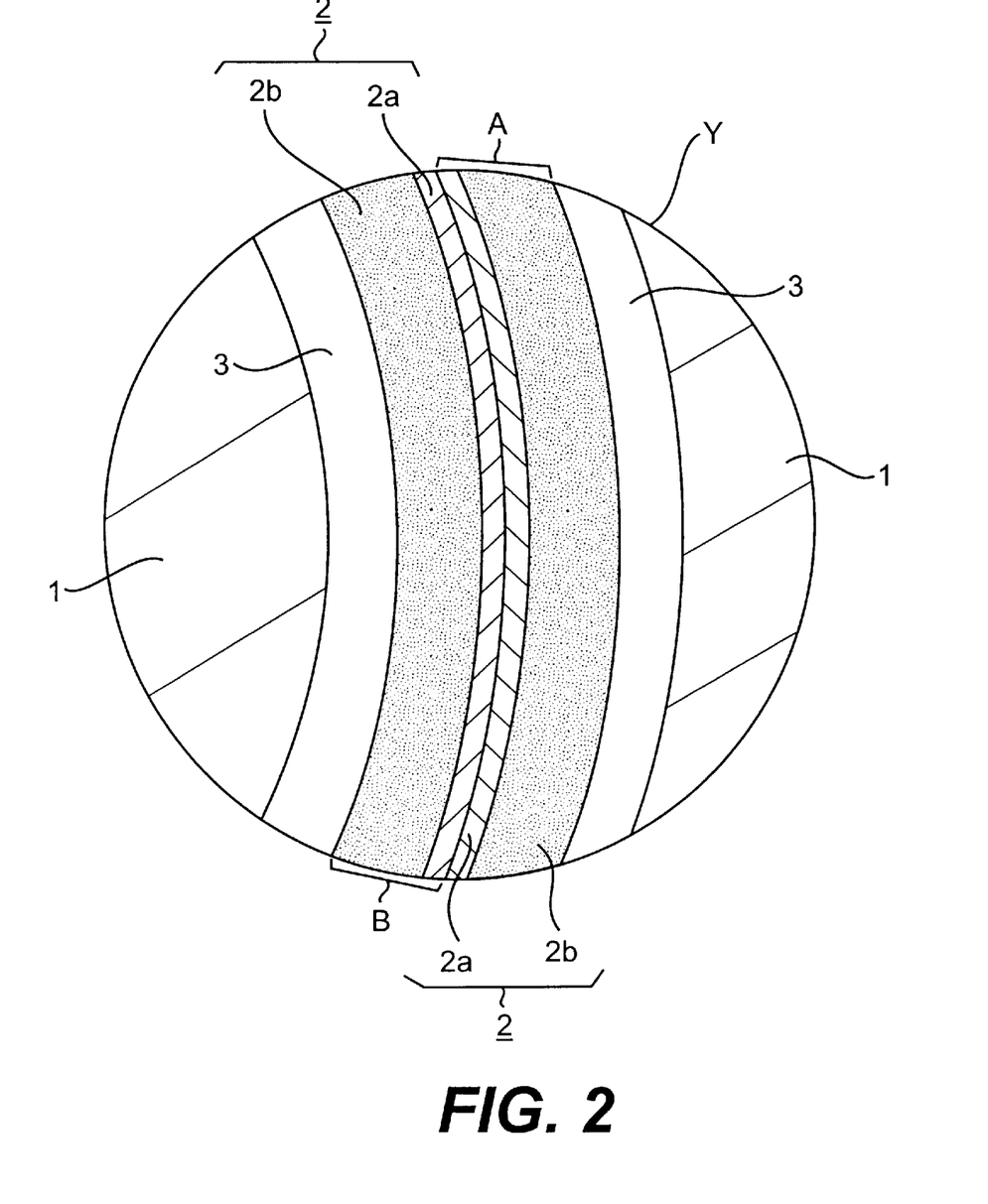
FIG. 2 is an enlarged view of a part of the electrode body in the circle Y of FIG. 1.

FIG. 2 is an enlarged view showing the laminate structure of the negative and positive electrodes and the separators in the circle Y of FIG. 1.

Each electrode 2 consists of the metal substrate 2a and the layer of the electrode active material 2b. The metal substrates 2a are in contact with each other in the spirally wound state. The central part of the separator 3 forms the core around which the laminate of the electrodes and separator is spirally wound as shown in FIG. 1. The positive electrode 1 has a collector (tab) 20 which is spot welded at the outer end. That is, the foam nickel substrate of the positive electrode is pressed to collapse the voids so that the paste containing nickel hydroxide does not penetrate into the voids. The pressed part of the substrate consists of the metal only. Then, one end of the nickel ribbon as the collector 20 for the positive electrode is spot welded to the pressed part. The structure of the collector 20 is the same in FIGS. 5, 7, 9 and 11.

First, the innermost turn of the spiral consists of the Negative Electrode Sheet A and the positive electrode. The Negative Electrode Sheet B is added from the second turn on the inner side of the Negative Electrode Sheet A with the metal substrates 2a being in direct contact with each other, and the both surfaces of the positive electrode face the Negative Electrode Sheets A and B through the separator 3. The outermost turn of the negative electrode consists of the Negative Electrode Sheet B only.

The metal substrate is exposed on the outer periphery of the negative electrode 2 (not shown), and in contact with the inner wall of a cell case 5, the inner surface of which is drawn by a thin line in FIG. 1. Accordingly, the cell case 5 functions as a negative electrode terminal.

FIG. 1 schematically shows the structure of the electrode body, and a large space is left between the electrode body 4 and the cell case 5 since the electrodes and the separator having the very thin thicknesses as described above are depicted as if they have certain thicknesses. However, this space is very small in the actual cell. This explanation applies to FIGS. 5, 7, 9 and 11 also.

A 30% aqueous solution of potassium hydroxide was used as the electrolytic solution in Example 1.

A U-4 type alkaline secondary cell of the nickel-hydrogen occlusion alloy type was assembled by the conventional method except that the electrode body 4 having the above structure was inserted in the cell case 5, and 0.85 ml of the electrolytic solution was poured in the cell case 5. The assembled cell had the structure of FIG. 3.

Figure 3:
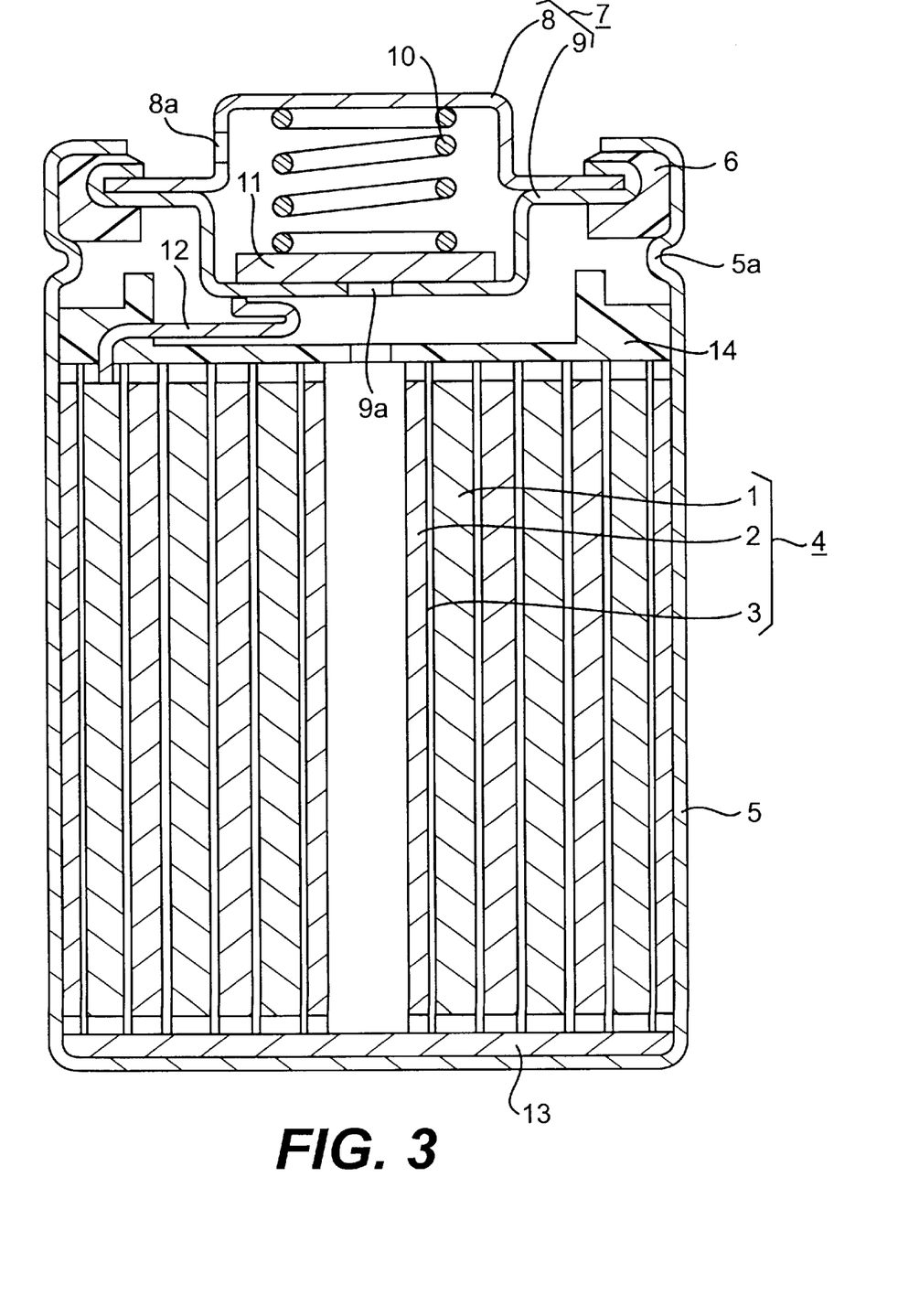
FIG. 3 is a cross section of a cell comprising the electrode body assembled in Example 1.

The cell of FIG. 3 comprises the electrode body 4 having the positive electrode 1, the negative electrodes 2 and the separator 3, the cell case 5, an annular gasket 6, a cell lid 7 having a terminal plate 8 and a sealing plate 9, a metal spring 10, a valve 11, a lead member 12 for the positive electrode, and insulators 13 and 14.

The positive electrode 1 and the negative electrodes 2 are those described above, provided that the negative electrodes 2 are depicted as a single layer for simplicity. The electrode body 4 is assembled as explained above and inserted in the cell case 5. The insulator 14 is placed on the electrode body 4.

The annular gasket 6 is made of Nylon 66, and the cell lid 7 has the terminal plate 8 and the sealing plate 9. The annular gasket 6 and the cell lid together seal the opening of the cell case 5.

That is, the electrode body 4, the insulator 14 and the like are inserted in the cell case 5, and then a groove 5a is formed around the periphery near the opening of the case so that the bottom of the groove 5a protrudes inwardly. The annular gasket 6 and the cell lid 7 are placed in the opening of the cell case 5 with supporting the bottom of the gasket by the protruded part. The upper edge of the cell case 5 is inwardly clamped to seal the opening of the cell case with the cell lid 7 and the annular gasket 6.

The terminal plate 8 has a hole 8a for exiting gases, and the sealing plate 9 has a gas-detection hole 9a. The metal spring 10 and the valve 11 are positioned between the terminal plate 8 and the sealing plate 9. The peripheral edge of the sealing plate 9 is inwardly folded and holds the periphery of the terminal plate 8 to fix the terminal pate 8 and the sealing plate 9.

The valve 11 closes the gas-detection hole 9a by the pressing force exerted by the spring 10, and the internal space of the cell is maintained in a sealed state under the normal conditions. Once the gas is generated in the cell and the internal pressure increases abnormally, the pressure pushes the valve and then the spring contracts to form a gap between the valve 11 and the gas-detection hole 9a. Then, the gas is allowed to exhaust in the atmosphere through the gas-detection hole 9 and the gas exiting hole 9a, and therefore the burst of the cell is prevented.

One end of the lead member 12 is spot welded to the collector (tab) 20 as explained above in connection with FIG. 1 (though not shown in FIG. 3), and the other end of the lead member 12 is spot welded to the lower surface of the sealing plate 9. The terminal plate 8 is in contact with the sealing plate 9 and thus functions as the positive electrode terminal.

The metal substrate of the negative electrode 2 is exposed on the peripheral surface of the electrode body 4 as explained above and in contact with the inner wall of the cell case 5. Thus, the cell case 5 functions as the negative electrode terminal. The cross sectional view of FIG. 3 is the schematic one. Therefore, FIG. 3 does not show the details of the positive and negative electrodes 1, 2 and the separator 3, and their positioning is slightly different from FIG. 1. Furthermore, the positive lead member 12 is shown as if it were welded to the cut plane, and the cross section of the negative electrode 2 is different from that in FIGS. 1 and 2.

Figure 12:
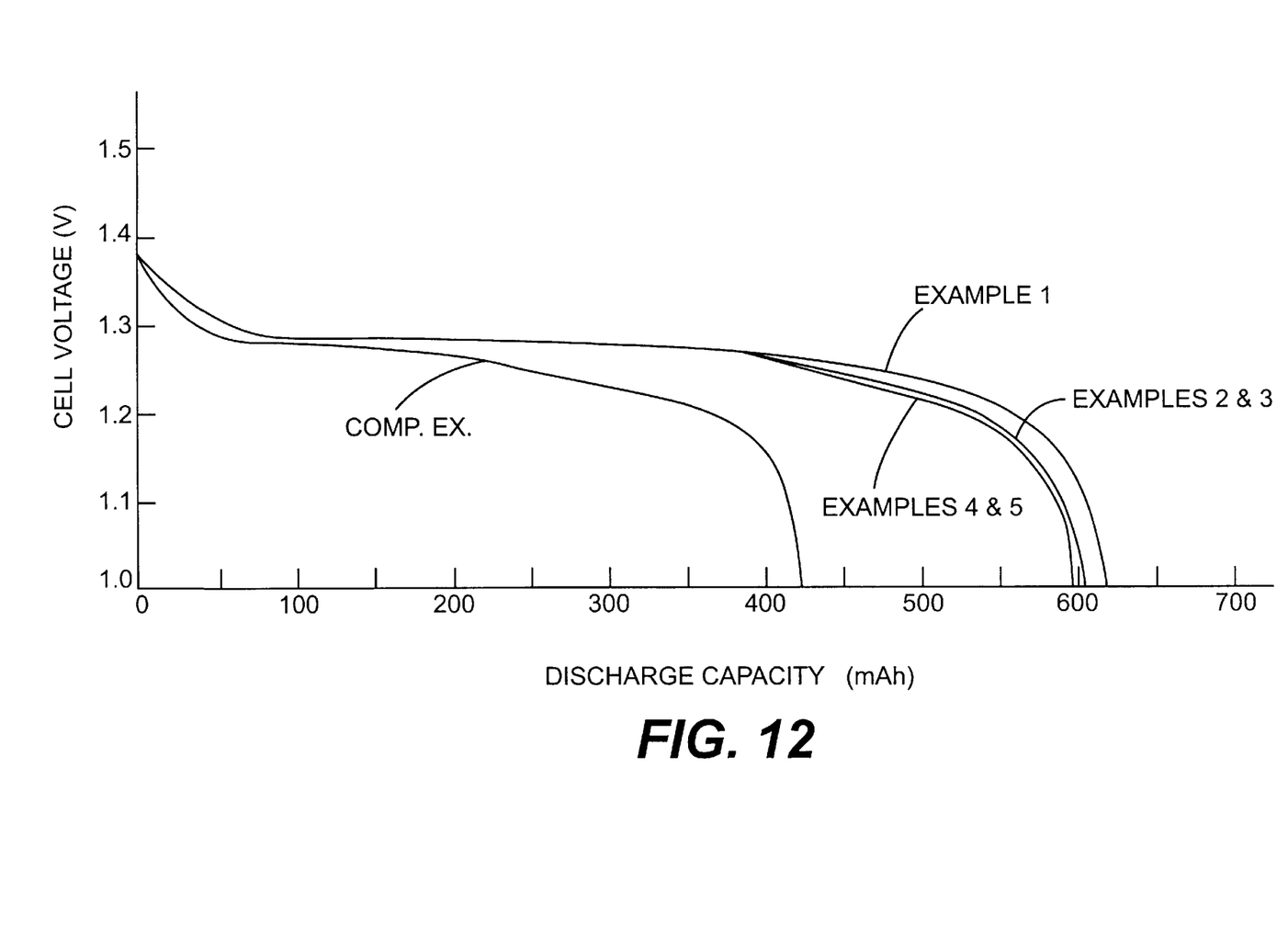
FIG. 12 is a graph showing the discharge characteristics of the cells assembled in Examples 1–5 and Comparative Example.

The cell assembled in Example 1 had the theoretical electric capacity of 600 mAh under the positive electrode control. The discharge characteristic of this cell which was discharged at 20° C. and 0.1 A is shown in FIG. 12.

The negative electrodes had the theoretical electric capacity of 977 mAh. Thus, the ratio of the electric capacity of negative electrode to that of positive electrode was 1.63:1.

Example 2

Figure 4A:
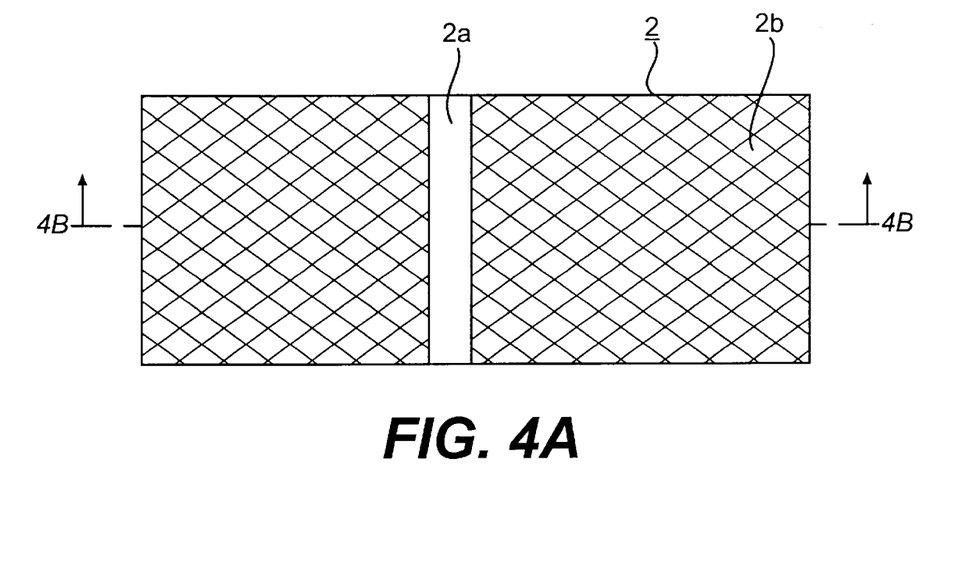
FIGS. 4A and 4B are a side view and cross section, respectively, of an electrode body according to the second embodiment of the present invention and used in Example 2.
Figure 4B:
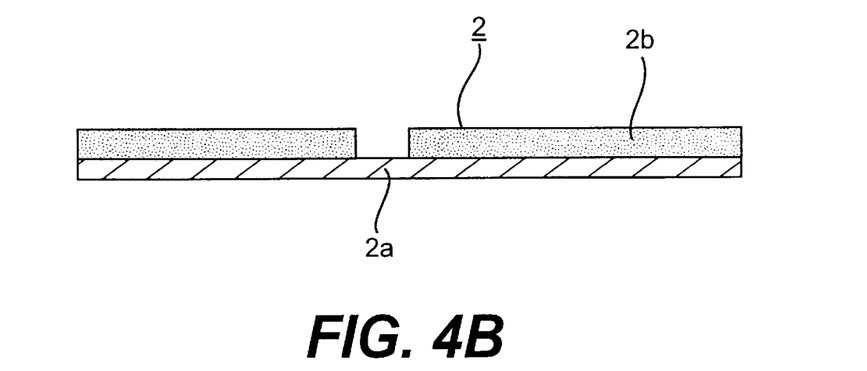

A negative electrode having a part on which no layer of the electrode active material was formed was prepared as shown in FIG. 4. FIG. 4A is a side view of a surface of the negative electrode having the layer of the electrode active material, and FIG. 4B is a cross section along the line X—X in FIG. 4A. The layer of the electrode active material is cross hatched in FIG. 4A for clarity.

A nickel plate having a thickness of 20 μm was used as the metal substrate 2a, and the layer of the electrode active material having the thickness of 180 μm was formed on one surface of the substrate 2a. However, a part of the substrate lacked the layer of the electrode active material. The substrate 2a had the length of 100 mm and the width of 35 mm. The layer of active electrode material 2b was formed in the length of 38 mm from one edge. Then, no layer of the electrode active material was formed in the length of 6.5 mm, and again the layer of the electrode active material was formed in the remaining length of 55.5 mm. However, FIG. 4 is a schematic one and does not depict the above lengths and the size of the substrate exactly.

Figure 5:
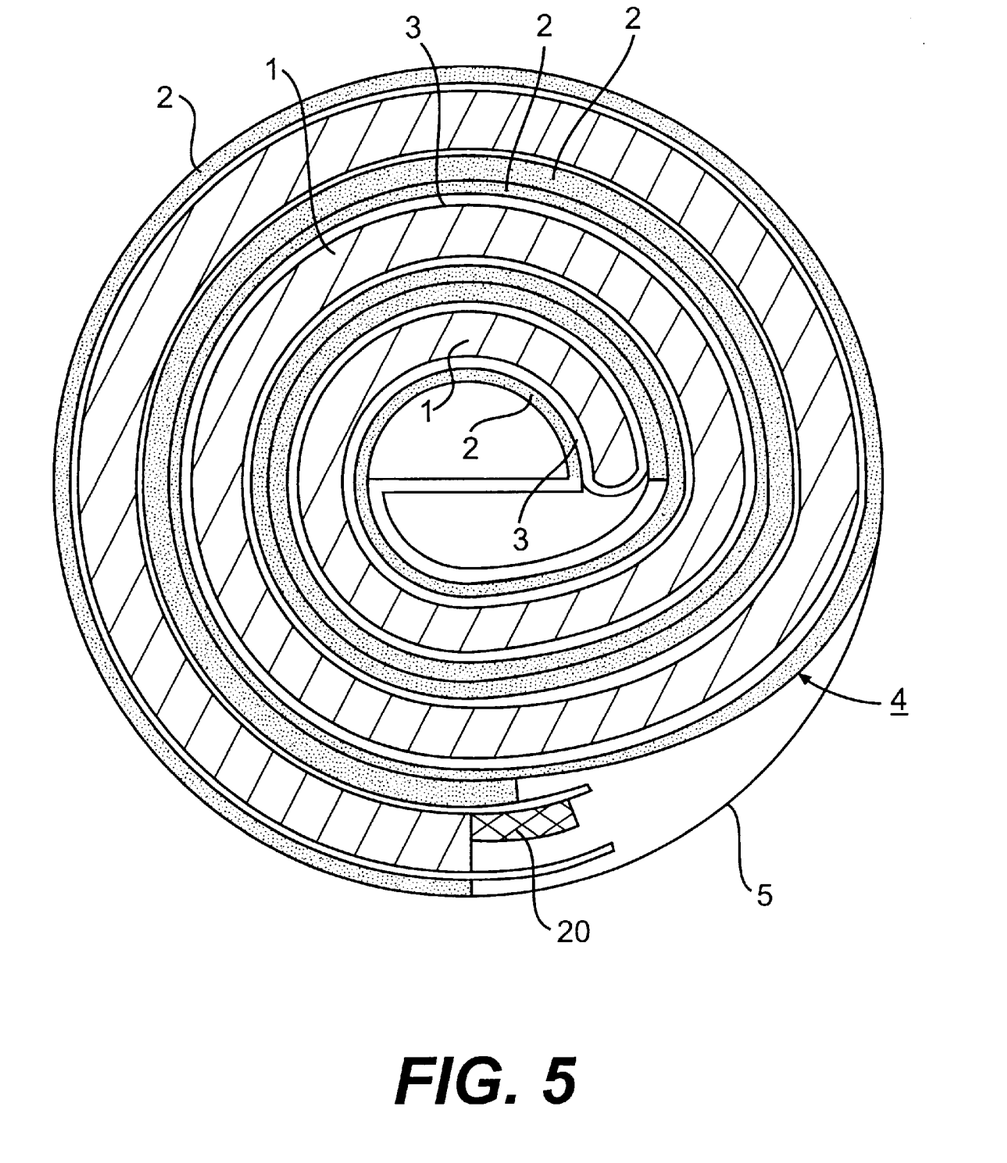
FIG. 5 is a cross section of the electrode body assembled in Example 2.

The negative electrode 2 and the positive electrode 1 were spirally wound starting from the part of the negative electrode substrate having no layer of the electrode active material with interposing the separator 3 between them to assemble the spirally wound electrode body 4 shown in FIG. 5. The layers of the electrode active material of the negative electrode 2 were in direct contact with the both surfaces of the positive electrode 1 through the separators, and the metal substrate 2a of the negative electrode in one turn (except the outermost turn) was in direct contact with that in the subsequent turn like in FIG. 2.

The innermost and outermost turns have the single negative electrode 2, and the metal substrate 2a was exposed on the peripheral surface of the electrode body 4 and in contact with the inner wall of the cell case 5.

The positive electrode 1 used in Example 2 was the nickel electrode produced in the same manner as in Example 1 and had the thickness of 660 μm and the size of 35 mm×46 mm. The separator 3 was the same polypropylene non-woven fabric as used in Example 1.

The U-4 type alkaline secondary cell of the nickel-hydrogen occlusion alloy type was assembled in the same manner as in Example 1 except that the above spirally wound electrode body was used.

The cell assembled in Example 2 had the theoretical electric capacity of 600 mAh under the positive electrode control. The discharge characteristic of this cell which was discharged at 20° C. and 0.1 A is shown in FIG. 12.

The negative electrodes had the theoretical electric capacity of 977 mAh. Thus, the ratio of the electric capacity of negative electrode to that of positive electrode was 1.63:1.

Example 3

Figure 6A:
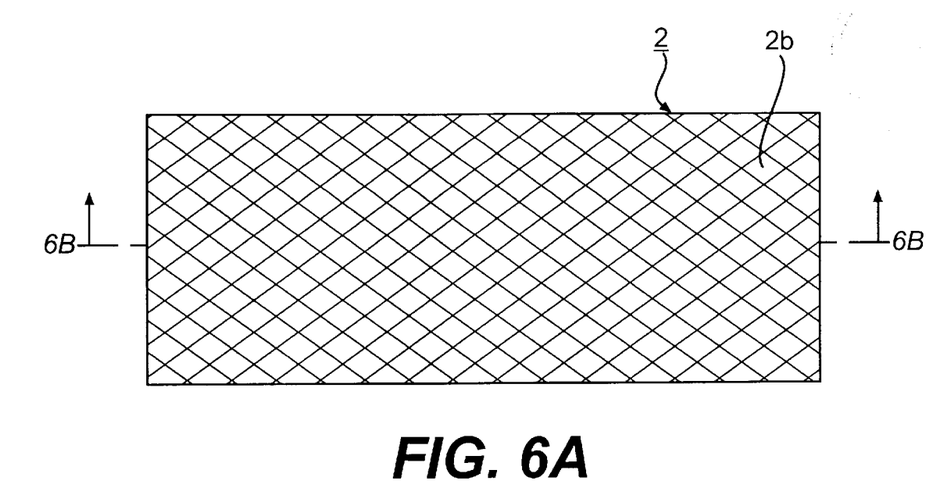
FIGS. 6A and 6B are a side view and cross section, respectively, of an electrode body according to the third embodiment of the present invention and used in Example 3.
Figure 6B:
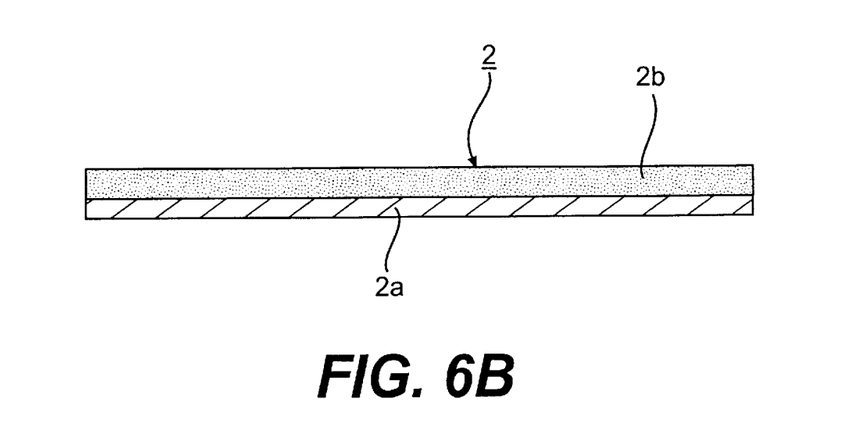

A negative electrode having the structure of FIG. 6 was used. This negative electrode was the same as that of FIG. 4 except that this negative electrode had the layer of the electrode active material over the whole surface. FIG. 6A is a side view of a surface of the negative electrode having the layer of the electrode active material, and FIG. 6B is a cross section along the line W—W in FIG. 6A. The layer 2b of the electrode active material is cross hatched in FIG. 6A for clarity.

A nickel plate having a thickness of 20 μm was used as the metal substrate 2a, and the layer of the electrode active material having the thickness of 180 μm was formed on one surface of the substrate 2a. Thus, the total thickness of the negative electrode 2 was 200 μm.

Figure 7:
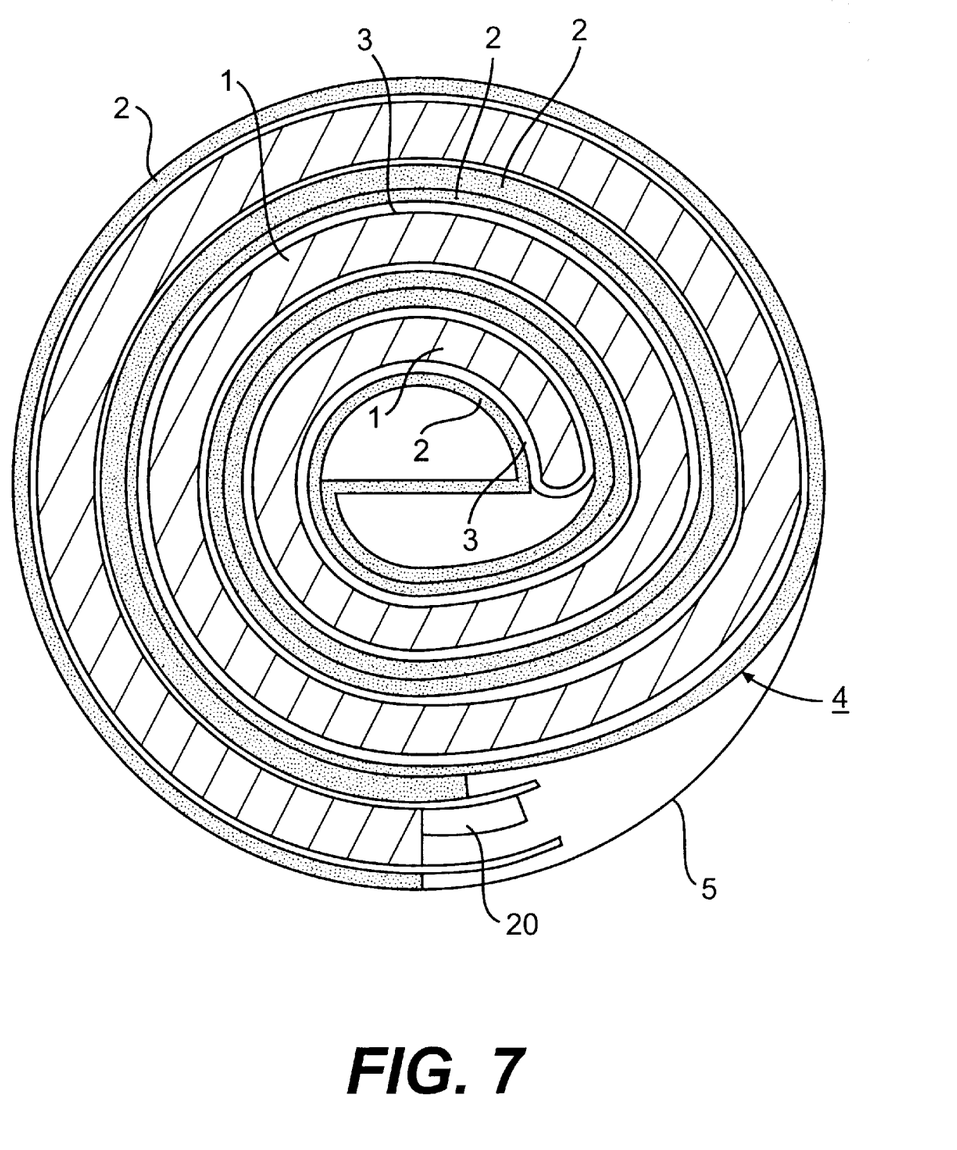
FIG. 7 is a cross section of the electrode body assembled in Example 3.

The negative electrode 2 and the positive electrode 1 were spirally wound with interposing the separator between them to assemble the electrode body 4 shown in FIG. 7. Although not clear from FIG. 7, the core diameter in this Example was smaller than that in Example 2 by 0.2 mm which corresponded to the thickness of the layer of the electrode active material. The negative electrode 2 was in contact with the both surfaces of the positive electrode 1 through the separator, and the metal substrate 2a of the negative electrode in one turn (except the outermost turn) was in direct contact with that in the subsequent turn like in FIG. 2.

The innermost and outermost turns have the single negative electrode 2, and the metal substrate 2a was exposed on the peripheral surface of the electrode body 4 and in contact with the inner wall of the cell case 5.

The positive electrode 1 used in Example 3 was the nickel electrode produced in the same manner as in Example 1 and had the thickness of 660 μm and the size of 35 mm×46 mm. The separator 3 was the same polypropylene non-woven fabric as used in Example 1.

The U-4 type alkaline secondary cell of the nickel-hydrogen occlusion alloy type was assembled in the same manner as in Example 1 except that the above spirally wound electrode body was used.

The cell assembled in Example 3 had the theoretical electric capacity of 600 mAh under the positive electrode control.

The discharge characteristic of this cell which was discharged at 20° C. and 0.1 A is shown in FIG. 12. The result was substantially the same as in Example 3.

The negative electrodes had the theoretical electric capacity of 1041 mAh. Thus, the ratio of the electric capacity of negative electrode to that of positive electrode was 1.74:1, while it was 1.63 in the facing portions.

Example 4

Figure 8A:
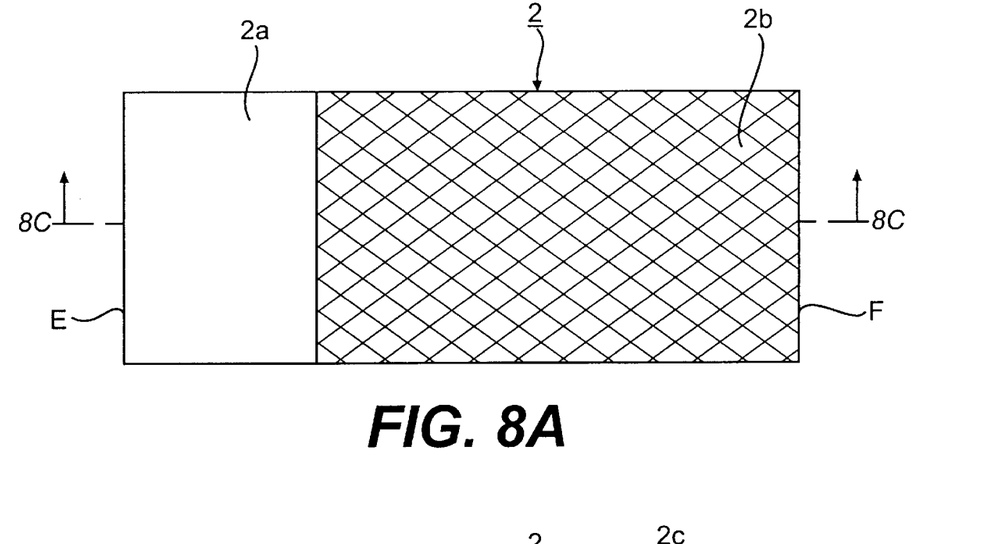
FIGS. 8A, 8B and 8C are one side view, the other side view and cross section, respectively, of an electrode body according to the fourth embodiment of the present invention and used in Example 4.
Figure 8B:
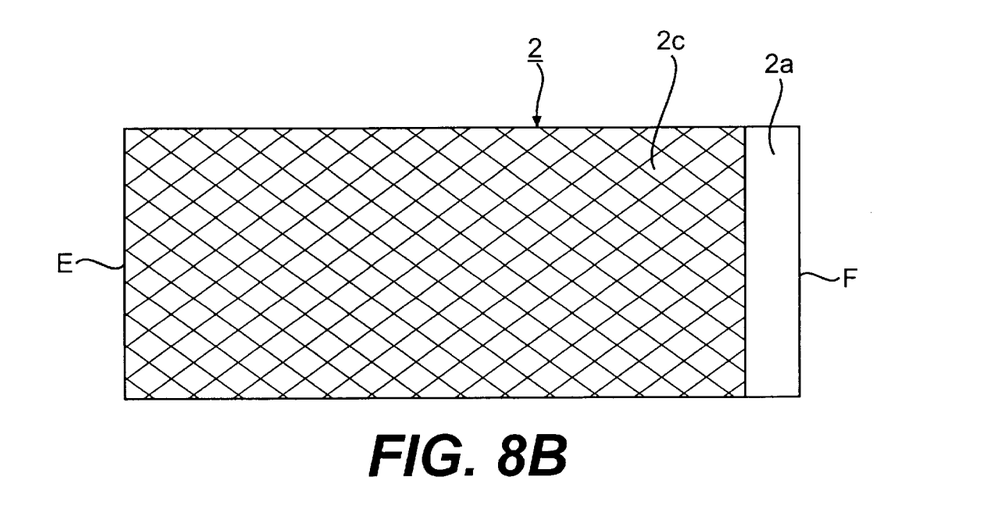
Figure 8C:
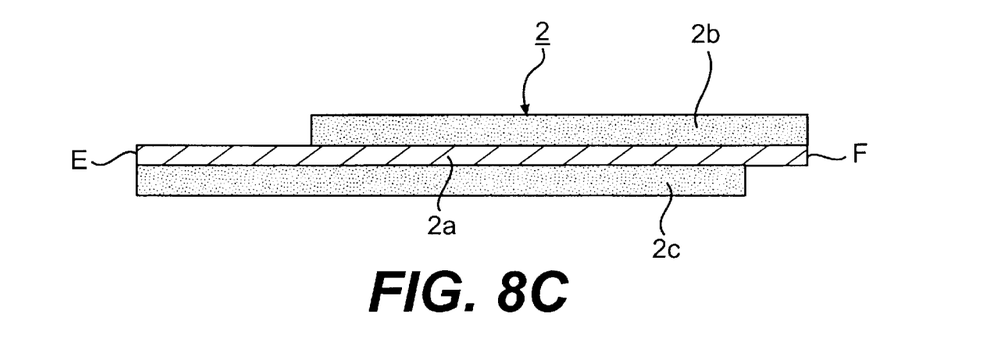

A negative electrode having parts on which no layer of the electrode active material was formed was prepared as shown in FIG. 8. FIG. 8A is a side view of one surface of the negative electrode having the layer 2b of the electrode active material, FIG. 8B is a side view of the other surface of the negative electrode having the layer 2c of the electrode active material, and FIG. 8C is a cross section along the line V—V in FIG. 8A. The layers 2b and 2c of the electrode active material are cross hatched in FIGS. 8A and 8B for clarity.

A nickel plate having a thickness of 20 μm was used as the metal substrate 2a, and the layers 2b and 2c of the electrode active material having the thicknesses of 200 μm and 145 μm, respectively were formed on the respective surfaces of the substrate 2a. However, parts of the substrate lacked the layer of the electrode active material. That is, the substrate 2a had the length of 67 mm and the width of 35 mm, but the edge part having the length of 26 mm from one edge E had no layer of the electrode active material and the remaining surface part had the layer 2b of the electrode active material as shown in FIG. 8A, while the edge part having the length of 3.8 mm from the other edge F had no layer of the electrode material and the remaining surface part had the layer 2c of the electrode active material as shown in FIG. 8B.

Figure 9:
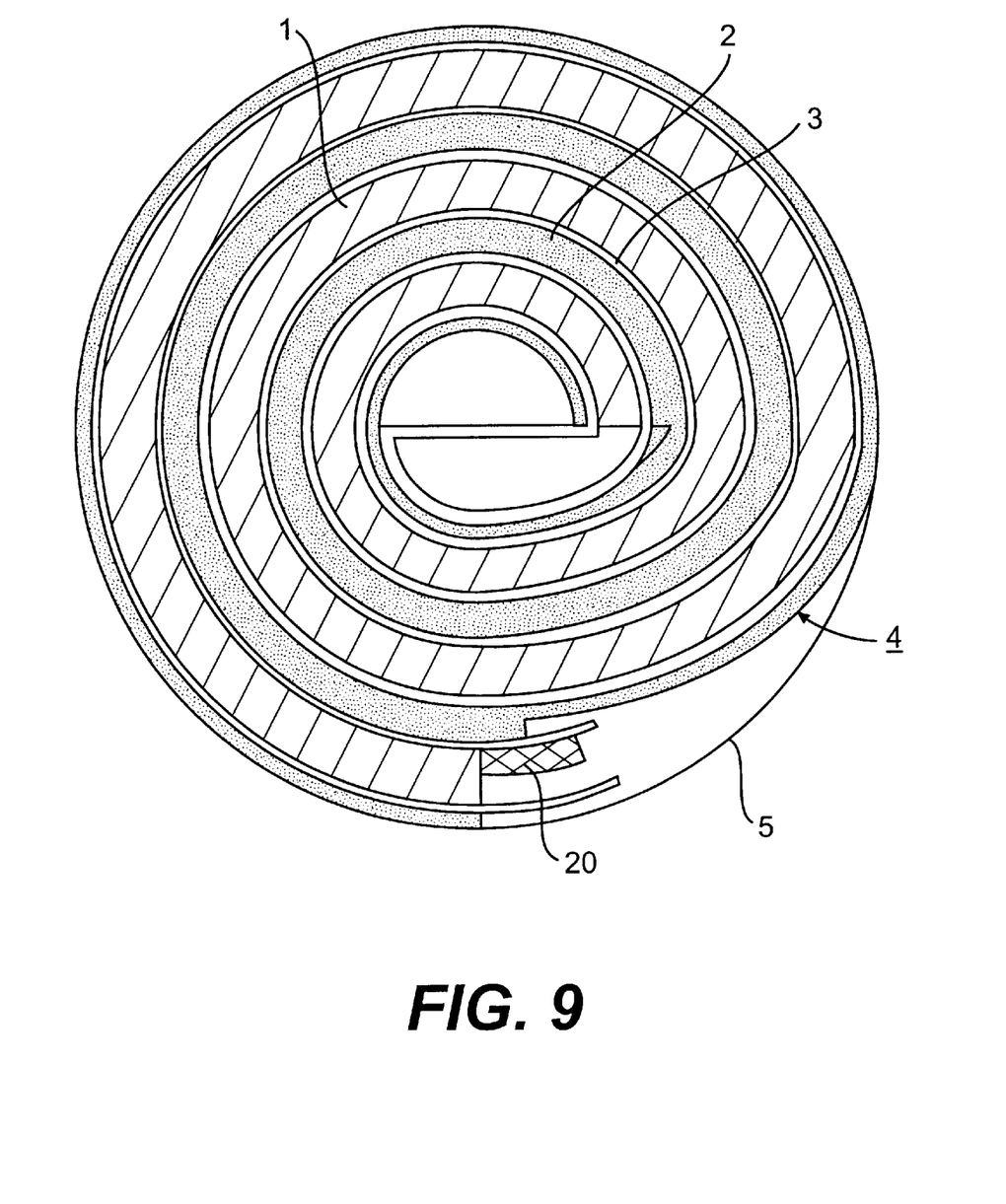
FIG. 9 is a cross section of the electrode body assembled in Example 4.

The negative electrode 2 and the positive electrode 1 were spirally wound starting from the edge F with interposing the separator between them to assemble the electrode body 4 shown in FIG. 9. In this Example, the separator 3 was folded at its center and placed over the negative electrode 2 so that the separator covered the both surfaces of the negative electrode.

FIGS. 8 and 9 are the schematic ones and do not depict the above lengths and the size of the substrate exactly.

The structures which are not clearly shown in FIG. 9 will be explained. Only the layer 2b of the electrode active material faced the positive electrode 1 through the separator 3 in the innermost turn of the negative electrode, while only the layer 2c of the electrode active material faced the positive electrode 1 through the separator 3 in the outermost turn of the negative electrode. The layers 2b and 2c of the electrode active material faced the positive electrode through the separator in all other turns.

The metal substrate 2a is exposed on the peripheral surface of the electrode body 4 and in contact with the inner wall of the cell case 5.

The positive electrode 1 used in Example 4 was the nickel electrode produced in the same manner as in Example 1 and had the thickness of 660 μm and the size of 35 mm×46 mm. The separator 3 was the same polypropylene non-woven fabric as used in Example 1.

The U-4 type alkaline secondary cell of the nickel-hydrogen occlusion alloy type was assembled in the same manner as in Example 1 except that the above spirally wound electrode body was used.

The cell assembled in Example 4 had the theoretical electric capacity of 600 mAh under the positive electrode control.

The discharge characteristic of this cell which was discharged at 20° C. and 0.1 A is shown in FIG. 12.

The negative electrodes had the theoretical electric capacity of 977 mAh. Thus, the ratio of the electric capacity of negative electrode to that of positive electrode was 1.63:1.

Example 5

The electrode body 4 was assembled in the same manner as in Example 4 except that the negative electrode shown in FIG. 10 and produced by the method described below was used. The structure of the electrode body was the same as that of Example 4 shown in FIG. 9.

Figure 10A:
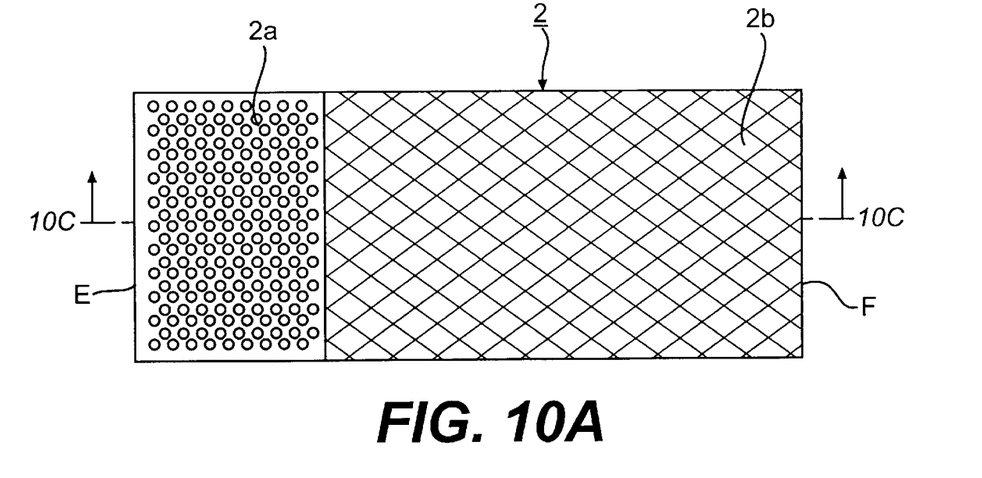
FIGS. 10A, 10B and 10C are one side view, the other side view and cross section, respectively, of an electrode body according to the fifth embodiment of the present invention and used in Example 4.
Figure 10B:
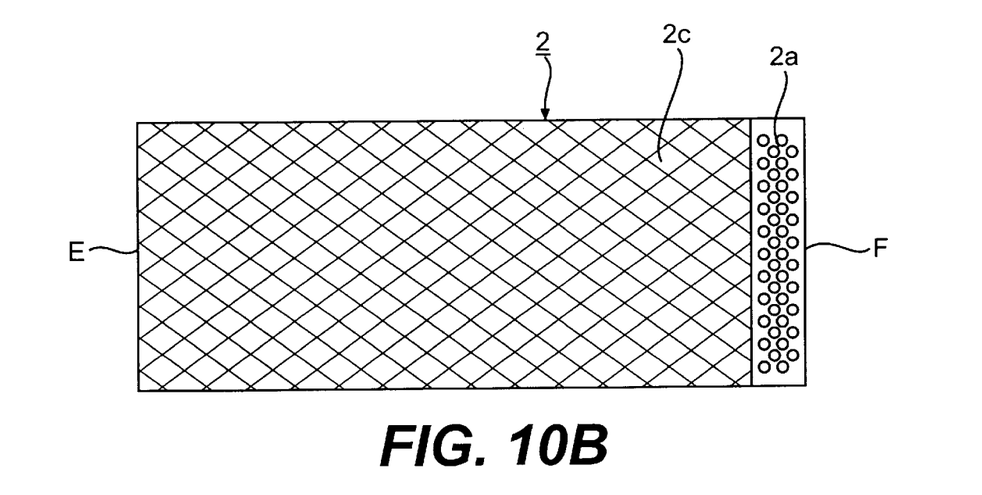
Figure 10C:
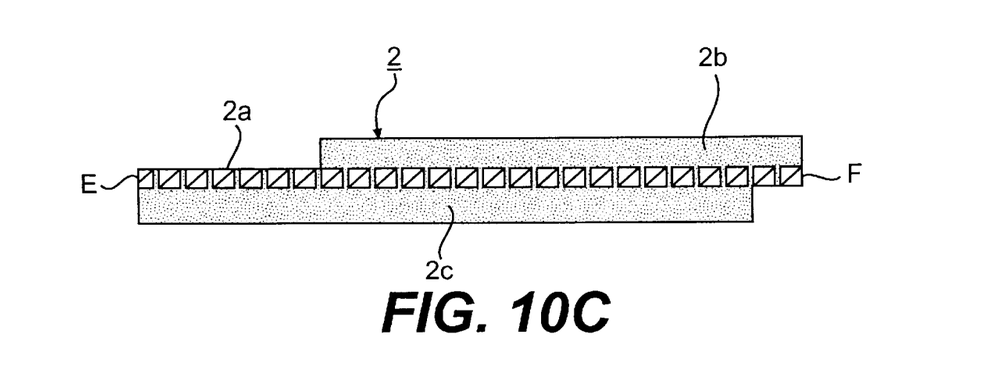

FIG. 10A is a side view of one surface of the negative electrode having the layer 2b of the electrode active material, FIG. 10B is a side view of the other surface of the negative electrode having the layer 2c of the electrode active material, and FIG. 10C is a cross section along the line U—U in FIG. 10A. The layers 2b and 2c of the electrode active material are cross hatched in FIGS. 10A and 10B for clarity.

The negative electrode 2 was produced by mixing 23 wt. parts of a binder solution containing 8.0% of polyethylene oxide dissolved in water in 100 wt. parts of the hydrogen occlusion alloy powder comprising $MmNi_5$ (in which Mm is the misch metal) followed by thorough stirring to obtain a homogeneous paste and coating the past on both surfaces of the perforated metal plate having the thickness of 50 $\mu$m followed by drying and roll pressing. The thicknesses and lengths of the layers 2b and 2c of the electrode active materials were the same as those in Example 4.

The perforated metal plate used was an iron plate having a thickness of 50 $\mu$m which was perforated and plated with nickel.

The U-4 type alkaline secondary cell of the nickel-hydrogen occlusion alloy type was assembled in the same manner as in Example 1 except that the above spirally wound electrode body was used.

The cell assembled in Example 5 had the theoretical electric capacity of 600 mAh under the positive electrode control.

The discharge characteristic of this cell which was discharged at 20° C. AND 0.1 A is shown in FIG. 12. The result was the same as that in Example 4.

The negative electrodes had the theoretical electric capacity of 977 mAh. Thus, the ratio of the electric capacity of negative electrode to that of positive electrode was 1.63:1.

Comparative Example

Twenty-three grams of a binder solution containing 2.6% of polyvinyl alcohol in water was mixed in 100 g of the hydrogen occlusion alloy powder comprising $MmNi_5$ (in which Mm is the misch metal) and thoroughly stirred to obtain a homogeneous paste.

The paste was filled in a foam nickel plate having a thickness of 600 $\mu$m, dried and roll pressed to obtain a negative electrode. The total thickness of the negative electrode was 250 $\mu$m to adjust the ratio of the electric capacity of the negative electrode to that of the positive electrode at 1.3. The negative electrode had the size of 35 mm×67 mm.

The positive electrode used in Comparative Example was the same paste type nickel electrode as used in Example 1 except that the thickness was 430 $\mu$m to adjust the ratio of the electric capacity of the negative electrode to that of the positive electrode at 1.3. The positive electrode had the size of 35 mm×51 mm.

The above negative and positive electrodes were spirally wound with interposing the same separator as used in Example 1 to assemble the electrode body as shown in FIG. 11.

Then, the U-4 type alkaline secondary cell of the nickel-hydrogen occlusion alloy type was assembled in the same manner as in Example 1 except that the above spirally wound electrode body was used.

The cell assembled in Comparative Example had the theoretical electric capacity of 410 mAh under the positive electrode control.

The discharge characteristic of this cell which was discharged at 20° C. and 0.1 A is shown in FIG. 12.

The negative electrodes had the theoretical electric capacity of 530 mAh. Thus, the ratio of the electric capacity of negative electrode to that of positive electrode was 1.3:1.

As seen from FIG. 12, the cells of Examples 1–5 had the larger discharge capacities by about 30% than that of Comparative Example.

The nickel-hydrogen occlusion alloy cells are explained in the above Examples, while the present invention can be applied to any cell comprising a spirally wound electrode body such as alkaline cells (e.g. nickel-cadmium cells, nickel-iron cells, nickel-zinc cells, etc.), lithium-manganese cells, lithium ion cells, and the like.

The present invention can increase the capacity of the cells.

According to the present invention, the negative electrode can be produced by the simple coating method, and therefore, the productivity of the cells is increased. Furthermore, the present invention can lower the costs of the cells, since it is not necessary for the present invention to use the expensive foam metal or sintered metal plate as the electrode substrate. In addition, the inner wall of the cell case is not flawed since the metal substrate is in contact with the inner wall of the cell case.

What is claimed is:

1. An alkaline secondary cell having a ratio of an electric capacity of a negative electrode to that of a positive electrode of at least 1, comprising an electrode body having a positive electrode and a pair of negative electrodes, which positive and negative electrodes are spirally wound with an interposing of separators therebetween and a cell case in which the electrode body is inserted, wherein each of the pair of negative electrodes comprise a metal substrate in the form of a metal plate having a thickness of between 10 and 50 $\mu$m, and face a respective surface of the positive electrode through one of said separators, and wherein the metal substrates of each of the pair of the negative electrodes are in contact with each other substantially in the second and subsequent turns, except the outermost turn.

2. The cell according to claim 1, wherein each negative electrode of said pair further comprises an electrode active material which is applied on one surface of the substrate or which is contained in pores in the substrate and applied on the surface of the substrate, and the layer of the electrode active material on the substrate faces the positive electrode through the separator.

3. An alkaline secondary cell having a ratio of an electric capacity of a negative electrode to that of a positive electrode of at least 1, comprising an electrode body having a positive electrode and a negative electrode, which negative and positive electrodes are spirally wound with an interposing of a separator therebetween and a cell case in which the electrode body is inserted, wherein the negative electrode is in the form of a metal substrate having a first and a second surface and optionally having pores, with a pair of layers of an electrode active material respectively formed on said first and second surfaces of the substrate, and said spiral having an innermost and outermost turn;

provided that in both the innermost and outermost turns of the electrode body, the negative electrode carries the electrode active material (i) only on one of said first and second surfaces of the substrate which faces said positive electrode through said separator or (ii) only in the pores of the substrate and only on one of said first and second surfaces of the substrate; and provided that each layer of the electrode active material of the negative electrode faces the positive electrode through said separator.

4. The cell according to claim 3, wherein the outermost turn of the electrode body consists of the negative electrode, and the metal substrate is exposed in the outermost turn and in contact with an inner wall of the cell case.

5. The cell according to claim 3, wherein said metal substrate is a perforated metal plate having a thickness of between 40 and 70 $\mu$m.

6. The cell according to claim 2 or 3, wherein a collector is bonded to the outermost turn of the positive electrode.

7. The cell according to claim 3, wherein the amount of the electrode active material per unit area of an inner layer of said pair of layers of the electrode active material is equal to or larger than that of an outer layer of said pair of layers of the electrode active material in the same turn and a weight ratio of the electrode active material per unit area of the inner layer of the electrode active material to that of the outer layer of the electrode active material is between 1:1 and 1.6:1.

8. An alkaline secondary cell having a ratio of an electric capacity of a negative electrode to that of a positive electrode of at least 1, comprising an electrode body having a positive electrode and a pair of negative electrodes, which positive and negative electrodes are spirally wound with an interposing of separators therebetween and a cell case in which the electrode body is inserted, wherein each of the pair of negative electrodes comprise a metal substrate in the form of a perforated metal plate having a thickness of between 40 and 70 $\mu$m, and face a respective surface of the positive electrode through one of said separators, and wherein the metal substrates of each of the pair of the negative electrodes are in contact with each other substantially in the second and subsequent turns, except the outermost turn.

9. The cell according to claim 8, wherein each negative electrode of said pair further comprises an electrode active material which is applied on one surface of the substrate or which is contained in pores in the substrate and applied on the surface of the substrate, nd layer of the electrode active material on the substrate faces the positive electrode through the separator.

10. An alkaline secondary cell having a ratio of an electric capacity of a negative electrode to that of a positive electrode of at least 1, comprising an electrode body having a positive electrode and a pair of negative electrodes, which positive and negative electrodes are spirally wound with an interposing of separators therebetween and a cell case in which the electrode body is inserted, wherein each of the pair of negative electrodes comprise a metal substrate in the form of a metal plate, and face a respective surface of the positive electrode through one of said separators, and wherein the metal substrates of each of the pair of the negative electrodes are in contact with each other substantially in the second and subsequent turns, except in an outermost turn; and wherein the outermost turn of the electrode body consists of a single negative electrode of said pair of negative electrodes, and wherein the metal substrate thereof is exposed in the outermost turn and in contact with an inner wall of the cell case.

* * * * *